Jan. 2, 1923.
H. SHOEMAKER.
PISTON ROD CONNECTION.
FILED NOV. 10, 1921.
1,440,801
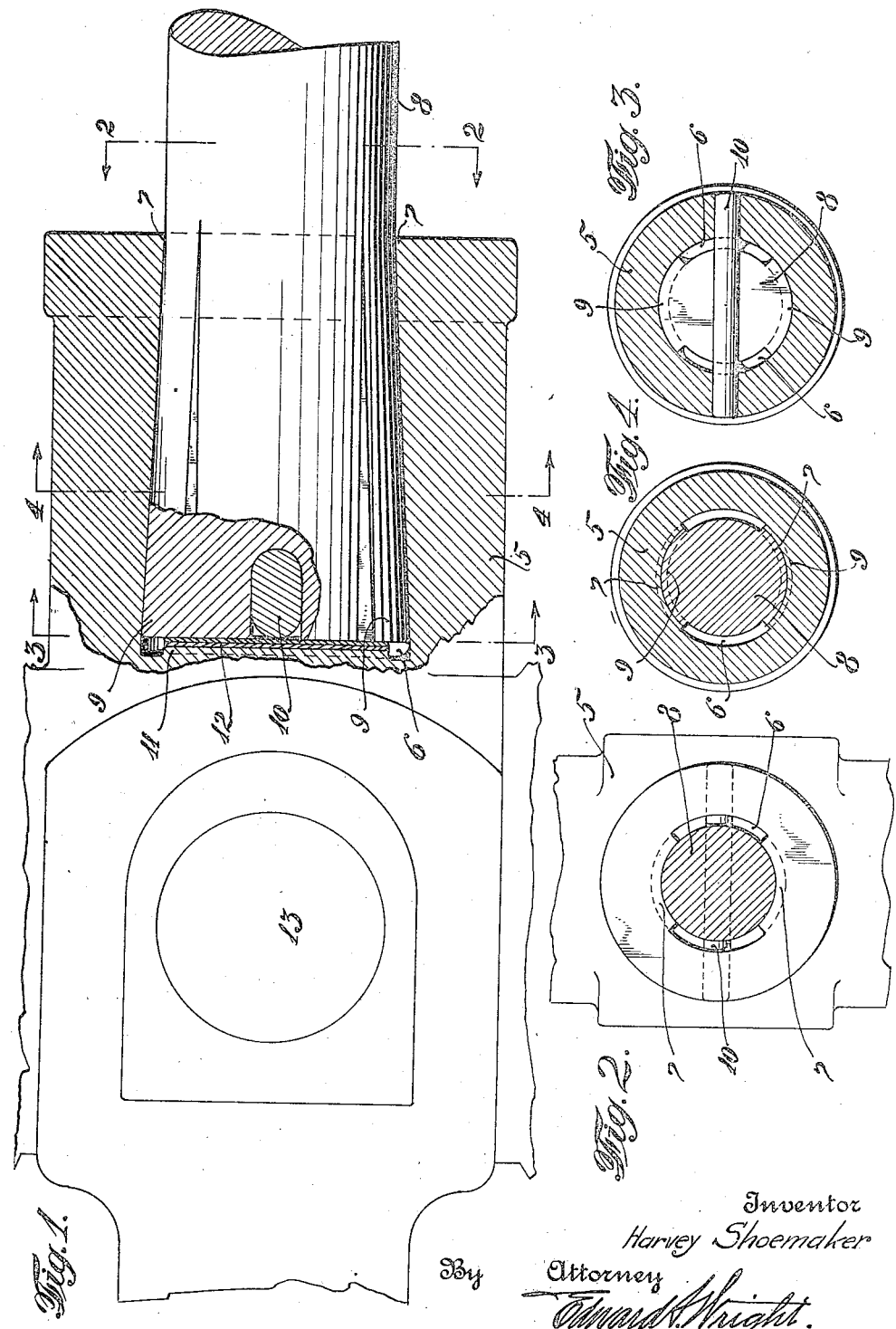
Inventor
Harvey Shoemaker
By Attorney
Edward A. Wright.

Patented Jan. 2, 1923.

1,440,801

UNITED STATES PATENT OFFICE.

HARVEY SHOEMAKER, OF WOLLASTON, MASSACHUSETTS.

PISTON-ROD CONNECTION.

Application filed November 10, 1921. Serial No. 514,195.

*To all whom it may concern:*

Be it known that I, HARVEY SHOEMAKER, a citizen of the United States, and a resident of Wollaston, in the county of Norfolk and State of Massachusetts, have invented a certain new and useful Improvement in Piston-Rod Connections, of which improvement the following is a specification.

This invention relates to means for connecting the piston rod to another member, such as the cross head of an engine, and has for its object to provide an improved form of connection which shall be simple and durable in construction, which may be readily attached and detached, when necessary, and one in which the impact or power transmitted from the rod to the cross head during the thrust in both directions shall be distributed over a considerable area of contact surface between said parts, whereby a rigid joint is maintained and the stress is transmitted directly to the main pin of the cross head.

According to one of the features of my improvement, the end portion of the piston rod is formed with flaring segmental projections adapted to engage with reversely tapering concave projections on the interior surface of the opening or socket in the cross head, the rod being adapted to slide into the socket when turned to a position in which the corresponding projections are out of line, and to be locked therein when turned to a position in which the corresponding reversely tapering projections engage each other. According to another feature, the flat end surface of the piston rod bears directly against a plane surface of the head, or a flat plate mounted thereon, for transmitting the thrust directly to the main pin.

In the accompanying drawing: Figure 1 is a longitudinal sectional view showing a piston rod connection embodying my improvement; Fig. 2, a transverse section taken on the line 2—2 of Fig. 1; Fig. 3, a similar section taken on the line 3—3 of Fig. 1; and Fig. 4, a similar section taken on the line 4—4 of Fig. 1.

According to the construction shown, the cross head, 5, is provided with an opening or socket, 6, otherwise substantially cylindrical, but being formed at its opposite sides with inwardly tapering concave projections, 7, while the piston rod, 8, is formed with corresponding flaring segmental projections, 9, of substantially the same dimensions as those in the cross head, but tapered in the reverse direction. As shown, each of the two projections extends about ninety degrees of the circumference of the rod, but it will be obvious that the number and circumferential length of the co-operating projections may be changed, if desired.

The arrangement of the socket and rod projections is such that by turning the rod upon its axis to a position about ninety degrees from that shown in the drawing, the rod may be slid into or out of the socket as the corresponding projections, 7 and 9, are then out of line, and the projections, 9, of the rod may slide longitudinally within the cylindrical portion of the socket. When slid clear in the full depth of the socket, the rod may be turned on its axis a sufficient distance to bring the corresponding projections of the head and rod into register with each other, whereupon the reversely tapered surfaces engage each other and the rod is thereby wedged and locked against outward movement. In order to then prevent rotation of the rod, a draw key, 10, may be inserted through transverse openings in the rod and head.

When locked in position, the flat inner end of the rod is adapted to bear against a plane surface, such as 11, at the bottom of the socket, or against one or more flat bearing plates, such as 12, mounted thereon, whereby the impact of the outward thrust of the rod is transmitted directly to the main pin, 13, of the cross head. The bearing plates or shims, 12, one or more, are preferably employed for taking up any looseness, thereby making the rod absolutely tight within the socket. During the inward thrust of the rod, it will be seen that the impact or stress will be distributed over the engaging areas of the corresponding projections, and will act to wedge these parts tightly together so that a substantially rigid joint will be maintained and the draw key will be relieved of all stress due to impact.

Having now described my invention, what I claim as new and desire to secure by Letters Patent is:

1. A piston rod connection comprising a head having a socket provided with internal tapered projections, and a rod having corresponding external projections reversely tapered for interlocking with those of said socket by a partial rotation.

2. A piston rod connection comprising a head having a socket provided with inwardly tapering concave projections upon its interior surface, and a rod having corresponding segmental projections tapered in the reverse direction.

3. A piston rod connection comprising a head having a socket provided with inwardly tapering concave projections upon its interior surface, a rod having corresponding segmental projections for interlocking with said socket projections by a partial rotation, and a transverse draw key for said rod.

4. A piston rod connection comprising a head having a substantially cylindrical socket provided with internal projections at opposite sides, said projections having tapering interior surfaces, and a rod having corresponding segmental projections and of a diameter substantially equal to that of said socket.

5. A piston rod connection, comprising a head having a socket provided with tapered internal projections at opposite sides, and a plane bearing surface at the bottom, and a rod bearing at its ends against said surface and having corresponding segmental tapered projections for interlocking with said socket projections by a partial rotation.

6. A piston rod connection, comprising a head having a socket provided with internal projections at opposite sides, and a plane bearing surface at the bottom, and a rod having corresponding segmental projections for interlocking with said socket projections by a partial rotation, and a bearing plate between the end of the rod and the bottom of the socket.

In testimony whereof I have hereunto set my hand.

HARVEY SHOEMAKER.